US012591641B2

(12) United States Patent
Edwards et al.

(10) Patent No.: US 12,591,641 B2
(45) Date of Patent: Mar. 31, 2026

(54) PROCESSING AN INPUT STREAM OF A USER DEVICE TO FACILITATE SECURITY ASSOCIATED WITH AN ACCOUNT OF A USER OF THE USER DEVICE

(71) Applicant: Capital One Services, LLC, McLean, VA (US)

(72) Inventors: Joshua Edwards, Philadelphia, PA (US); Lauren Fox, Herndon, VA (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 266 days.

(21) Appl. No.: 17/662,181

(22) Filed: May 5, 2022

(65) Prior Publication Data
US 2023/0359711 A1    Nov. 9, 2023

(51) Int. Cl.
*G06F 21/12* (2013.01)
*G06F 3/04842* (2022.01)

(52) U.S. Cl.
CPC ........ *G06F 21/128* (2013.01); *G06F 3/04842* (2013.01); *G06F 2203/04803* (2013.01); *G06F 2221/2119* (2013.01)

(58) Field of Classification Search
CPC .............. G06F 21/128; G06F 3/04842; G06F 2203/04803; G06F 2221/2119; G06F 3/04886
See application file for complete search history.

(56) References Cited

U.S. PATENT DOCUMENTS

| | | | |
|---|---|---|---|
| 5,835,722 A | 11/1998 | Bradshaw et al. | |
| 10,055,731 B2 * | 8/2018 | Ni ........................ | G06F 21/606 |
| 10,264,000 B2 | 4/2019 | Zhang et al. | |
| 10,356,125 B2 | 7/2019 | Goutal et al. | |
| 10,747,900 B1 * | 8/2020 | Bendersky .......... | G06F 21/6245 |
| 11,316,895 B1 * | 4/2022 | Wright ............... | H04L 63/1483 |
| 11,615,199 B1 * | 3/2023 | Poder ................. | G06F 21/6218 |
| | | | 726/6 |
| 2011/0066741 A1 * | 3/2011 | Hoefner ............... | G06F 16/955 |
| | | | 707/708 |
| 2014/0041005 A1 * | 2/2014 | He ....................... | H04L 63/0853 |
| | | | 726/7 |
| 2014/0136967 A1 * | 5/2014 | White ................... | G06F 40/274 |
| | | | 715/261 |
| 2017/0161525 A1 * | 6/2017 | Vieira ................. | G06F 21/6245 |
| 2017/0193246 A1 * | 7/2017 | Kelly ...................... | G06F 21/83 |
| 2017/0230363 A1 * | 8/2017 | Deutschmann ..... | H04W 12/065 |
| 2017/0316220 A1 * | 11/2017 | Eldar .................... | G06F 21/602 |
| 2017/0357441 A1 * | 12/2017 | Sanciangco ....... | H04M 1/72412 |
| 2018/0020017 A1 * | 1/2018 | Subramanya ....... | H04L 63/1425 |
| 2018/0288026 A1 * | 10/2018 | Callaghan ............. | H04L 9/3226 |

(Continued)

*Primary Examiner* — Daniel B Potratz
*Assistant Examiner* — Matthias Habtegeorgis
(74) *Attorney, Agent, or Firm* — Harrity & Harrity, LLP

(57) ABSTRACT

In some implementations, a user device may obtain an input stream, wherein the input stream is obtained via a virtual keyboard provided by the user device. The user device may process the input stream to determine that the input stream includes particular information. The user device may cause, based on determining that the input stream includes the particular information, one or more security parameters associated with an account of a user of the user device to be modified.

20 Claims, 11 Drawing Sheets

(56)            References Cited

U.S. PATENT DOCUMENTS

| | | | |
|---|---|---|---|
| 2019/0065767 A1* | 2/2019 | Kominar | G06F 21/83 |
| 2020/0112585 A1* | 4/2020 | Keohane | G06F 21/316 |
| 2020/0233977 A1* | 7/2020 | Chickerur | G06F 21/6254 |
| 2021/0019061 A1* | 1/2021 | Hiltgen | G06F 3/0632 |
| 2021/0073817 A1* | 3/2021 | Kallas | G06F 21/577 |
| 2021/0118012 A1* | 4/2021 | Chung | G06Q 30/0207 |
| 2022/0043932 A1* | 2/2022 | Shemer | G06F 40/279 |
| 2022/0156989 A1* | 5/2022 | Ji | G06T 11/203 |
| 2022/0303308 A1* | 9/2022 | Gopathy | H04L 63/1408 |
| 2023/0148065 A1* | 5/2023 | David | G06F 21/45 |
| | | | 726/5 |
| 2023/0283633 A1* | 9/2023 | Maisuria | H04L 63/1466 |
| | | | 726/22 |

* cited by examiner

100

120
Notification indicating that
the input stream includes
the particular information Security System Network Host server 115
Determine whether the input
stream includes particular
information

140
Communicate based on the one or more security parameters

Network

Host server

Security System

145
Grant or deny access to the account

First User Device

Second User Device $M^{th}$ User Device

100

510 ~ Provide a virtual keyboard

520 ~ Obtain, based on providing the virtual keyboard, an input stream

530 ~ Process the input stream to determine that the input stream includes particular information 540 ~ Send, to another device, a notification indicating that the input stream includes the particular information

500

600

610   Receive, from a user device, a notification

620   Determine, based on the notification, that the account of the user of the user device may be subject to an unauthorized access attempt 630   Modify, based on determining that the account may be subject to the unauthorized access attempt, one or more security parameters associated with the account

PROCESSING AN INPUT STREAM OF A USER DEVICE TO FACILITATE SECURITY ASSOCIATED WITH AN ACCOUNT OF A USER OF THE USER DEVICE

BACKGROUND

A user device can provide a virtual keyboard that allows for a user to enter information into the user device without a physical input device. A typical virtual keyboard is displayed on a display screen of the user device. The user interacts (e.g., via a touchscreen interface of the display screen) with keys of the virtual keyboard to enter particular characters into an input field of the virtual keyboard.

SUMMARY

Some implementations described herein relate to a non-transitory computer-readable medium that stores a set of instructions for a user device. The set of instructions, when executed by one or more processors of the user device, may cause the user device to provide a virtual keyboard for display on a display screen of the user device. The set of instructions, when executed by one or more processors of the user device, may cause the user device to obtain, based on providing the virtual keyboard, an input stream. The set of instructions, when executed by one or more processors of the user device, may cause the user device to process the input stream to determine that the input stream includes particular information. The set of instructions, when executed by one or more processors of the user device, may cause the user device to send, to another device, a notification indicating that the input stream includes the particular information.

Some implementations described herein relate to a system for facilitating security associated with an account of a user. The system may include one or more memories and one or more processors communicatively coupled to the one or more memories. The system may be configured to receive, from a user device, a notification indicating that an input stream obtained by the user device includes particular information. The system may be configured to determine, based on the notification, that the account of the user of the user device may be subject to an unauthorized access attempt. The system may be configured to modify, based on determining that the account may be subject to the unauthorized access attempt, one or more security parameters associated with the account.

Some implementations described herein relate to a method. The method may include obtaining, by a user device, an input stream, where the input stream is obtained via a virtual keyboard provided by the user device. The method may include processing, by the user device, the input stream to determine that the input stream includes particular information. The method may include causing, by the user device and based on determining that the input stream includes the particular information, one or more security parameters associated with an account of a user of the user device to be modified.

DETAILED DESCRIPTION

Figure 1A:
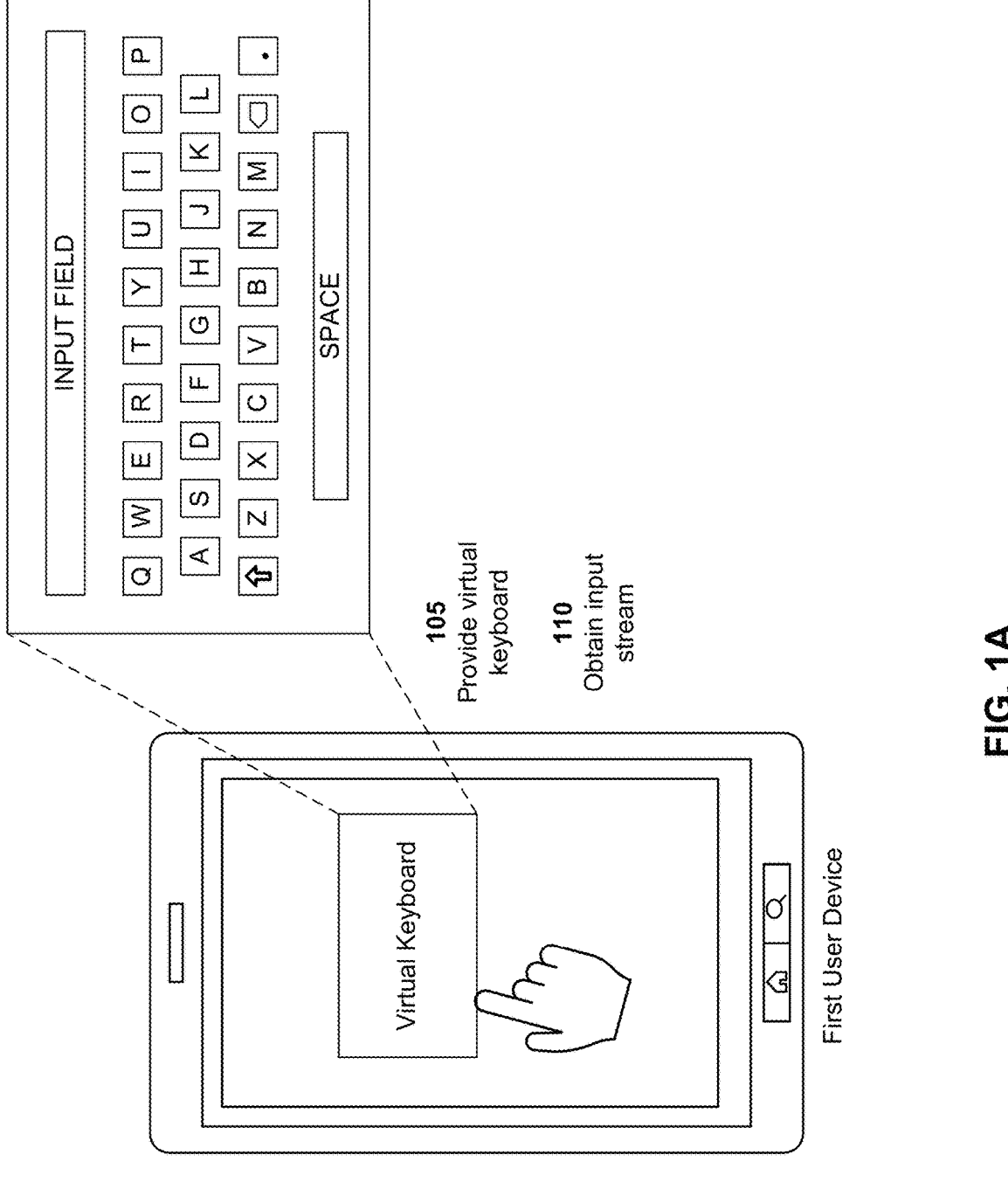
FIGS. 1A-1F are diagrams of an example implementation relating to processing an input stream of a user device to facilitate security associated with an account of a user of the user device.

The following detailed description of example implementations refers to the accompanying drawings. The same reference numbers in different drawings may identify the same or similar elements.

A user device can provide a virtual keyboard that allows for a user to enter information into the user device. However, in some cases, this enables a user to enter, via the virtual keyboard, particular information that may compromise the user device and/or that can be used to gain unauthorized access to an account of the user. For example, the user may mistype a uniform resource locator (URL) address of a legitimate website (e.g., by misspelling a domain name), which causes the user device to download and execute a malicious application. This malicious application can then cause the user device to attempt to gain unauthorized access to the account of the user (e.g., by using access information that is stored on the user device). As another example, the user may enter personal information of the user (e.g., a name, an address, and/or an identifier associated with the user, among other examples) and/or an authentication credential associated with the account of the user. In some cases, the user may cause this information to be shared with other user devices or websites, which may allow a bad actor to intercept and use the information to gain unauthorized access to the account of the user. Once the account is accessed, one or more fraudulent acts can be committed (e.g., by the malicious application and/or the bad actor). Consequently, computing resources (e.g., processing resources, memory resources, communication resources, and/or power resources, among other examples), such as of devices associated with maintaining the account, may be used to identify, address, and/or resolve issues associated with the one or more fraudulent acts.

Some implementations described herein provide a user device, which provides a virtual keyboard (e.g., that can be installed as a default virtual keyboard of the user device). The user device thereby obtains an input stream (e.g., that comprises one or more characters) via the virtual keyboard. The input stream is stored in a dynamically sized data structure (e.g., that changes size based on one or more characteristics associated with the input stream). The user device processes (e.g., in real-time or near real-time) the input stream to determine whether the input stream includes particular information (e.g., an authentication credential associated with an account of the user; personal information of the user, such as name, address, or contact information; or a potentially malicious URL address, such as a URL address of a mistyped legitimate URL address). This may indicate that a user of the user device is sharing information that can be used to access the account of the user and/or that the user has compromised the user device. The user device therefore sends a notification to another device associated with the account (e.g., a security server) to cause one or more security parameters associated with the account to be modified, which increases security associated with the account (e.g., by causing additional and/or more stringent authentication techniques to be used to access the account).

In this way, the user device reduces a likelihood that a malicious application and/or a bad actor is able to gain unauthorized access to the account of the user. For example, the malicious application and/or bad actor would not, without having access to additional information, be able to satisfy the additional and/or more stringent authentication techniques. Accordingly, this decreases a likelihood of unauthorized access to the account and thereby reduces a likelihood that the one or more fraudulent acts are committed. Accordingly, an amount of computing resources (e.g., processing resources, memory resources, communication resources, and/or power resources, among other examples), such as of devices associated with maintaining the account, needed to identify, address, and/or resolve issues associated with fraud is reduced.

FIGS. 1A-1F are diagrams of an example 100 associated with processing an input stream of a user device to facilitate security associated with an account of a user of the user device. As shown in FIGS. 1A-1F, example 100 includes one or more user devices (shown as a first user device through an $M^{th}$ user device, where M≥1), a security system, and a host server. These devices are described in more detail in connection with FIGS. 3 and 4.

The one or more user devices may be associated with a single user (e.g., the one or more user devices may be used by the user to communicate with the security system and/or other user devices). Each user device, of the one or more user devices may have a different association with the user. For example, the first user device may be a frequently used user device of the user (e.g., a personal smartphone of the user), a second user device may be a semi-frequently used user device of the user (e.g., a work computer of the user), a third user device may be an infrequently used user device of the user (e.g., a family-shared tablet computer), and/or so on.

As shown in FIG. 1A, and by reference number 105, the first user device may provide a virtual keyboard. The virtual keyboard may be, for example, associated with the security system (e.g., the virtual keyboard may be associated with a password manager application, of the first user device, that is provided by an organization associated with the security system) and may enable one or more security functionalities described herein. The first user device may provide the virtual keyboard for display on a display screen of the first user device. For example, a user of the first user device may interact with the first user device to cause the first user device to execute an application on the first user device, which may cause the first user device to provide the virtual keyboard for display on the display screen of the first user device. In a particular example, when the application is associated with an electronic messaging account, such as a text messaging account, an email account, or another messaging account, the first user device may provide the virtual keyboard (e.g., on at least a portion of the of the display screen of the first user device, such as a bottom portion of the display screen) to allow the user of the first user device to enter information to be included in an outgoing message associated with the electronic messaging account. As another example, when the application is a web browser application, the first user device may provide the virtual keyboard to allow the user of the first user device to enter information in a search field or navigation field of the web browser application and/or one or more input fields of a web form presented via the web browser application.

As further shown in FIG. 1A, the virtual keyboard may include keys for entering characters (shown as QWERTY keys) and an input field (shown as "INPUT FIELD"). Accordingly, the user of the first user device may interact with the virtual keyboard (e.g., by touching regions of the display screen that correspond to keys of the virtual keyboard) to enter information into the input field of the virtual keyboard (e.g., that is to be included in an outgoing message, a field of the web browser application, or an input field of a web form, among other examples).

As shown by reference number 110, the first user device may obtain an input stream (e.g., based on providing the virtual keyboard). For example, the user of the first user device may interact with keys of the virtual keyboard to enter one or more characters into the input field of the virtual keyboard. The first user device may obtain the one or more characters that are input into the first user device via the virtual keyboard (e.g., by reading, in real-time or near real-time, the one or more characters as the one or more characters are entered into the input field) and may store the one or more characters as the input stream in a data structure (e.g., an electronic file, a buffer, a cache, or a similar data structure).

In some implementations, a size of the data structure may be fixed (e.g., to store a particular number of the one or more characters entered into the input field of the virtual keyboard) or may be dynamic (e.g., to store a varying number of the one or more characters entered into the input field of the virtual keyboard).

In some implementations, the size of the data structure may be configured to dynamically change based on a value of at least one character of the one or more characters entered into the input field of the virtual keyboard. For example, the size of the data structure may be configured to expand or decrease to store a set of characters of the one or more characters that are entered after a character with a particular value, such as a "space" value or a "carriage return" value, is entered. In some implementations, the size of the data structure may be configured to dynamically change based on a pattern of at least one set of characters of the one or more characters entered into the input field of the virtual keyboard. For example, the size of the data structure may be configured to expand or decrease to store a set of characters of the one or more characters that are entered after another set of characters that have a pattern associated with a URL, such as a "www." pattern or a "http://" pattern, are entered.

In some implementations, the size of the data structure may be configured to dynamically change based on a total amount of time associated with inputting the one or more characters into the input field of the virtual keyboard. For example, the size of the data structure may be configured to expand or decrease to store a set of characters of the one or more characters that are entered during a particular time period, wherein a length of the particular time period may be less than or equal to 2 seconds, 5 seconds, or 10 seconds, for example. In some implementations, the size of the data structure may be configured to dynamically change based on a total quantity of the one or more characters. For example, the size of the data structure may be configured to expand to store all of the one or more characters when the total quantity of the one or more characters is less than or equal to a quantity threshold and/or may be configured to decrease to store a portion of the one or more characters when the total quantity of the one or more characters is greater than the quantity threshold. In some implementations, the size of the data structure may be configured to dynamically change based on a display status of the virtual keyboard. For example, the size of the data structure may be configured to expand or decrease to store a set of characters of the one or more characters that are entered while the virtual keyboard is displayed on the display screen of the first user device (e.g., as part of the virtual keyboard being "open" on the first user device).

Figure 1B:
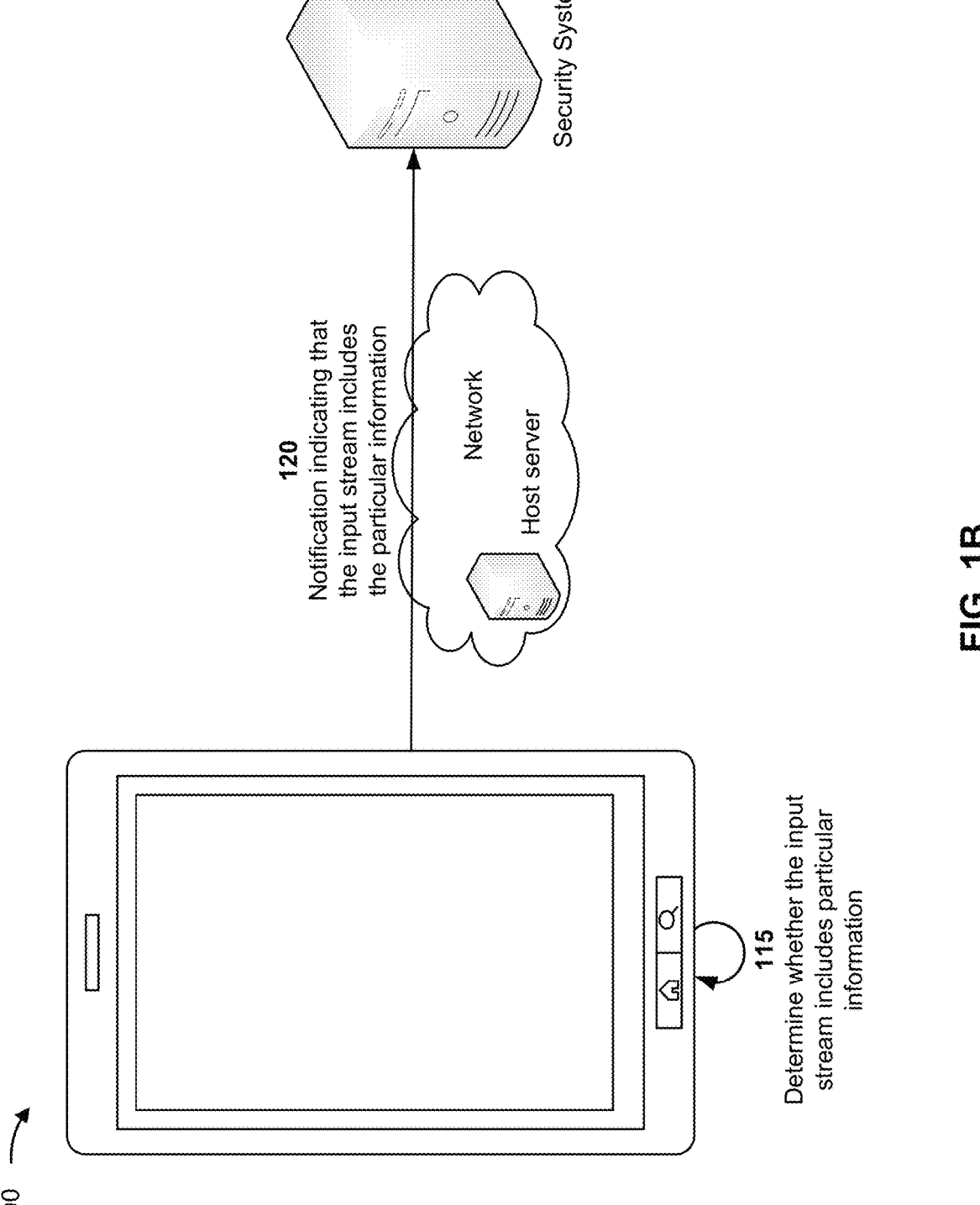

In some implementations, the first user device may process the input stream. For example, as shown in FIG. 1B and by reference number 115, the first user device may process the input stream to determine whether the input stream includes particular information. The particular information may include, for example, an authentication credential (e.g., a username, a password, and/or an answer to a knowledge based question, among other examples) associated with an account (e.g., a social media account, a financial account, or an electronic communications account, among other examples) of the user of the first user device, personal information (e.g., a name; an identifier, such as a social security number or driver's license number; an account identifier, such as a credit card number or bank account number) associated with the user of the first user device, or a potentially malicious URL address (e.g., a URL address not associated with a well-known website, such as an URL address not associated with one of the one-thousand most visited websites).

In some implementations, the first user device may process the input stream to identify one or more strings included in the input stream. For example, when the input stream includes a "space" character in the middle of the input stream, the first user device may process the particular input stream to identify a first string positioned before the space character and a second string positioned after the space character. Additionally, or alternatively, the first user device may process, using one or more cryptographic techniques (e.g., a hash cryptographic technique, a salt-and-hash cryptographic technique, and/or another cryptographic technique), the input stream to generate one or more cryptographic values. For example, the first user device may process the one or more strings of the input stream to generate one or more cryptographic values (e.g., that are respectively associated with the one or more strings). In this way, the first user device may obscure one or more "true" values associated with the input stream and may therefore safeguard the input stream.

In some implementations, the first user device may identify information stored in a data structure of the first user device (e.g., that is different from the data structure described above in relation to the virtual keyboard), which may be used to further process the input stream. For example, the first user device may compare the input stream, the one or more strings of the input stream, and/or the one or more cryptographic values, and the information stored in the data structure to determine whether the input stream includes the particular information. The first user device may determine that the input stream includes the particular information when the input stream, the one or more strings of the input stream, and/or the one or more cryptographic values matches (e.g., is equal to) the information stored in the data structure. Alternatively, the first user device may determine that the input stream does not include the particular information when the input stream, the one or more strings of the input stream, and/or the one or more cryptographic values does not match (e.g., is not equal to) the information stored in the data structure.

In a first particular example, the user device may identify authentication credential information stored in a data structure that is configured to store information associated with the account of the user of the first user device. The authentication credential information may include, for example, one or more authentication credentials (e.g., of the user) that are associated with the account. The one or more authentication credentials may be obtained from the user of the first user device at a prior time (e.g., when the virtual keyboard is installed on the first user device), and the first user device may use one or more cryptographic techniques (e.g., as described above) on the one or more authentication credentials to generate and store the authentication credential information in the data structure. Accordingly, the first user device may compare the one or more cryptographic values (e.g., that the first user device generated based on the input stream) and the authentication credential information (e.g., that is stored in the data structure) to determine whether the input stream includes the one or more authentication credentials that are associated with the account. For example, the first user device may determine that the input stream includes the one or more authentication credentials when the one or more cryptographic values and the authentication credential information match (e.g., the one or more cryptographic values and the authentication credential information are the same). Alternatively, the first user device may determine that the input stream does not include the one or more authentication credentials when the one or more cryptographic values and the authentication credential information do not match (e.g., the one or more cryptographic values and the authentication credential information are not the same).

In a second particular example, the user device may identify user information stored in a data structure that is configured to store information associated with the user of the first user device. The user information may include, for example, personal information associated with the user. The user information may be obtained from the user of the first user device at a prior time (e.g., when the virtual keyboard is installed on the first user device). Accordingly, the first user device may compare the one or more strings of the input stream and the user information (e.g., that is stored in the data structure) to determine whether the input stream includes the personal information. For example, the first user device may determine that the input stream includes the personal information when the one or more strings and the user information match (e.g., the one or more strings and the user information are the same). Alternatively, the first user device may determine that the input stream does not include the personal information when the one or more strings and the user information do not match (e.g., the one or more strings and the user information are not the same).

In a third particular example, the user device may identify URL address information stored in a data structure that is configured to store information associated with potentially malicious URL addresses. The URL address information may include, for example, one or more potentially malicious URL addresses and/or one or more potentially malicious URL address patterns. Accordingly, the first user device may compare the one or more strings of the input stream and the URL address information (e.g., that is stored in the data structure) to determine whether the input stream includes a potentially malicious URL address. For example, the first user device may determine that the input stream includes a potentially malicious URL address when the one or more strings and the URL address information match (e.g., at least some of the one or more strings and the URL address information are the same). Alternatively, the first user device may determine that the input stream does not include a potentially malicious URL address when the one or more strings and the URL address information do not match (e.g., the one or more strings and the URL address information are not the same).

In some implementations, the first user device may use a machine learning model to determine whether the input stream includes particular information (e.g., an authentication credential associated with an account of the user of the first user device, personal information of the user, and/or a potentially malicious URL address). For example, the first user device may process, using the machine learning model, the input stream, the one or more strings of the input stream, and/or the one or more cryptographic values (e.g., that are respectively associated with the one or more strings) to determine whether the input stream includes the particular information. In some implementations, the first user device may train the machine learning model based on historical data (e.g., historical input streams, historical strings, and/or historical cryptographic values) and/or additional information, such as identification information for each data element of the historical data. Using the historical data and/or the additional information as inputs to the machine learning model, the server device may train the machine learning model to determine whether an input stream includes particular information. In some implementations, the machine learning model may be trained and/or used in a manner similar to that described below with respect to FIG. 2.

Accordingly, when the first user device determines that the input stream includes particular information, the first user device may generate a notification. The notification may indicate that the input stream includes the particular information. As shown by reference number 120, the first user device may send the notification to the security system. For example, the first user device may send the notification to a host server of a network, which may send the notification to the security system.

Figure 1C:
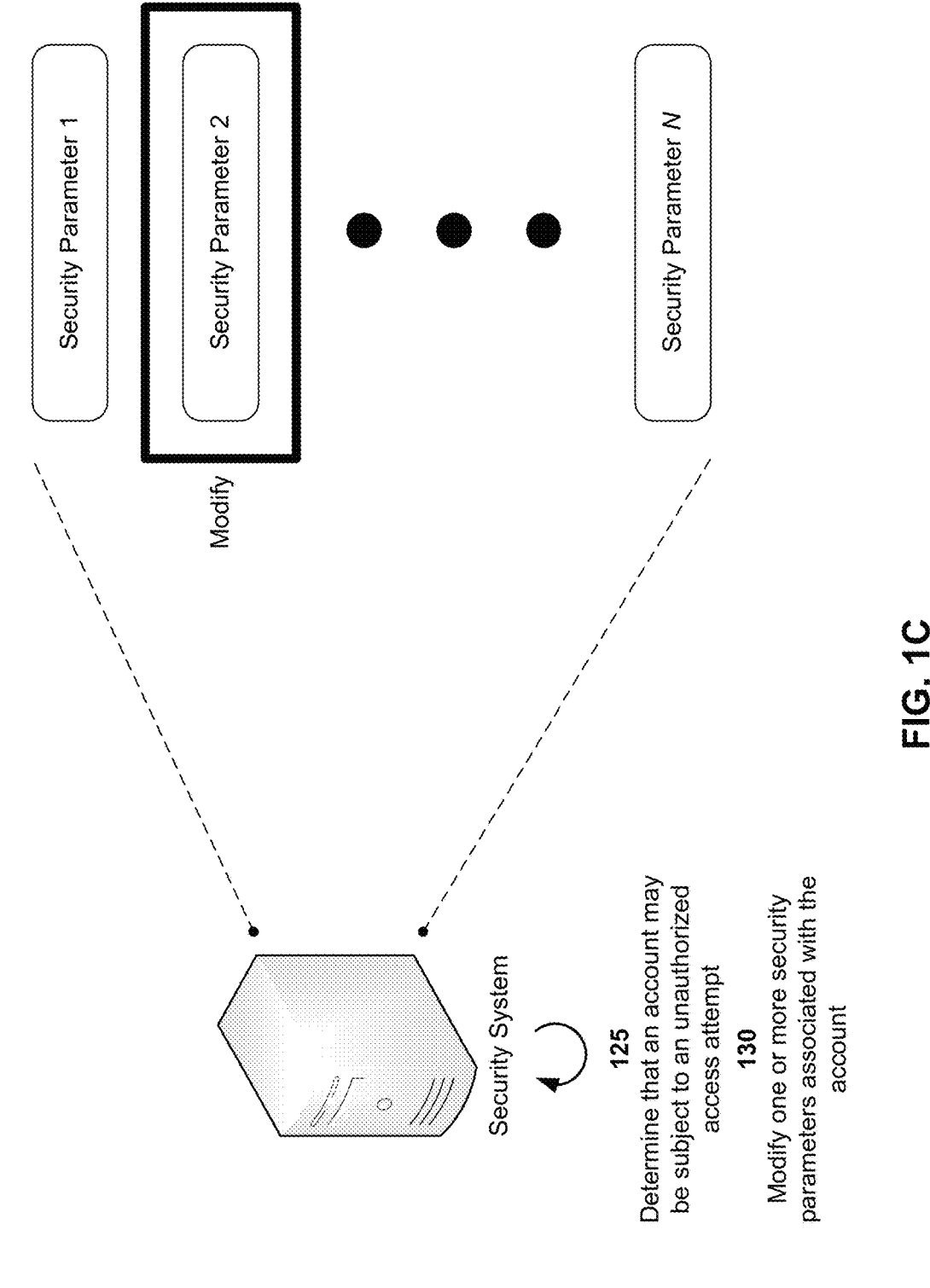

As shown in FIG. 1C, and by reference number 125, the security system may determine that the account of the user of the first user device may be subject to an unauthorized access attempt. For example, the security system may process (e.g., parse) the notification to determine that the account may be subject to an unauthorized access attempt.

As shown by reference number 130, the security system may modify one or more security parameters associated with the account (e.g., based on determining that the account may be subject to the unauthorized access attempt). For example, the security system may cause an authentication credential reset procedure associated with the account to be initiated (e.g., prevent a current authentication credential from being used to access the account and send a message, such as an email, to an electronics communication account associated with the user that includes a URL address to reset the current authentication credential). As another example, the security system may cause a stepped-up authentication flag associated with the account to be set. In some implementations, when the stepped-up authentication flag is set, the user must provide different and/or additional authentication credentials to access the account.

In some implementations, after modifying the one or more security parameters associated with the account, the security system may send a message, such as an email, to an electronic messaging account associated with the user. The message may include information indicating modification of the one or more security parameters associated with the account and/or the particular information (e.g., to indicate a reason to the user for modification of the one or more security parameters associated with the account).

Figure 1D:
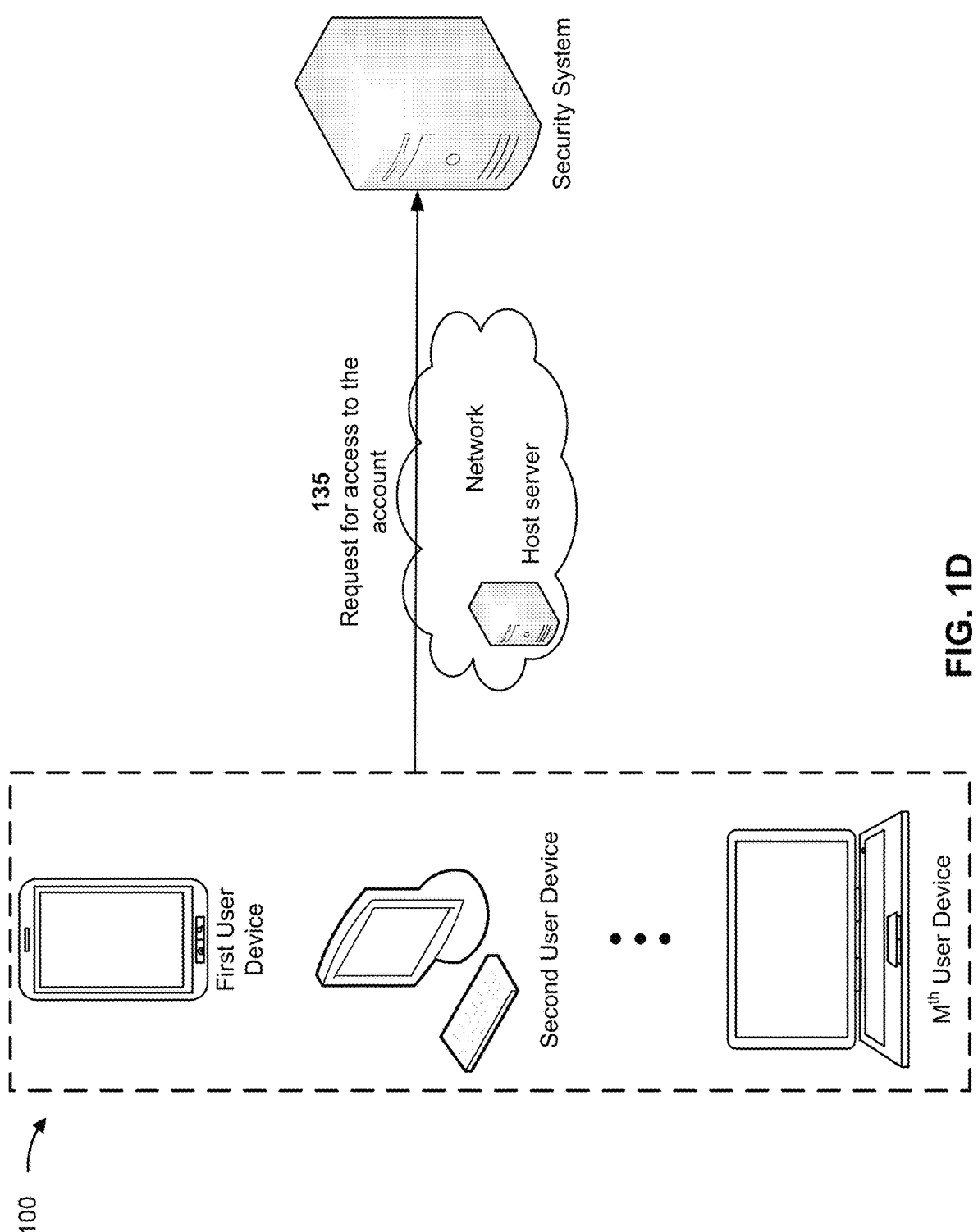

As shown in FIG. 1D, and by reference number 135, a particular user device, of the one or more user devices (e.g., the first through M$^{th}$ user devices), may send a request to the security system (e.g., after the one or more security parameters associated with the account have been modified). For example, the particular user device may send the request to the host server of the network, which may send the request to the security system. The request may be for access to the account (e.g., of the user of the first user device).

Figure 1E:
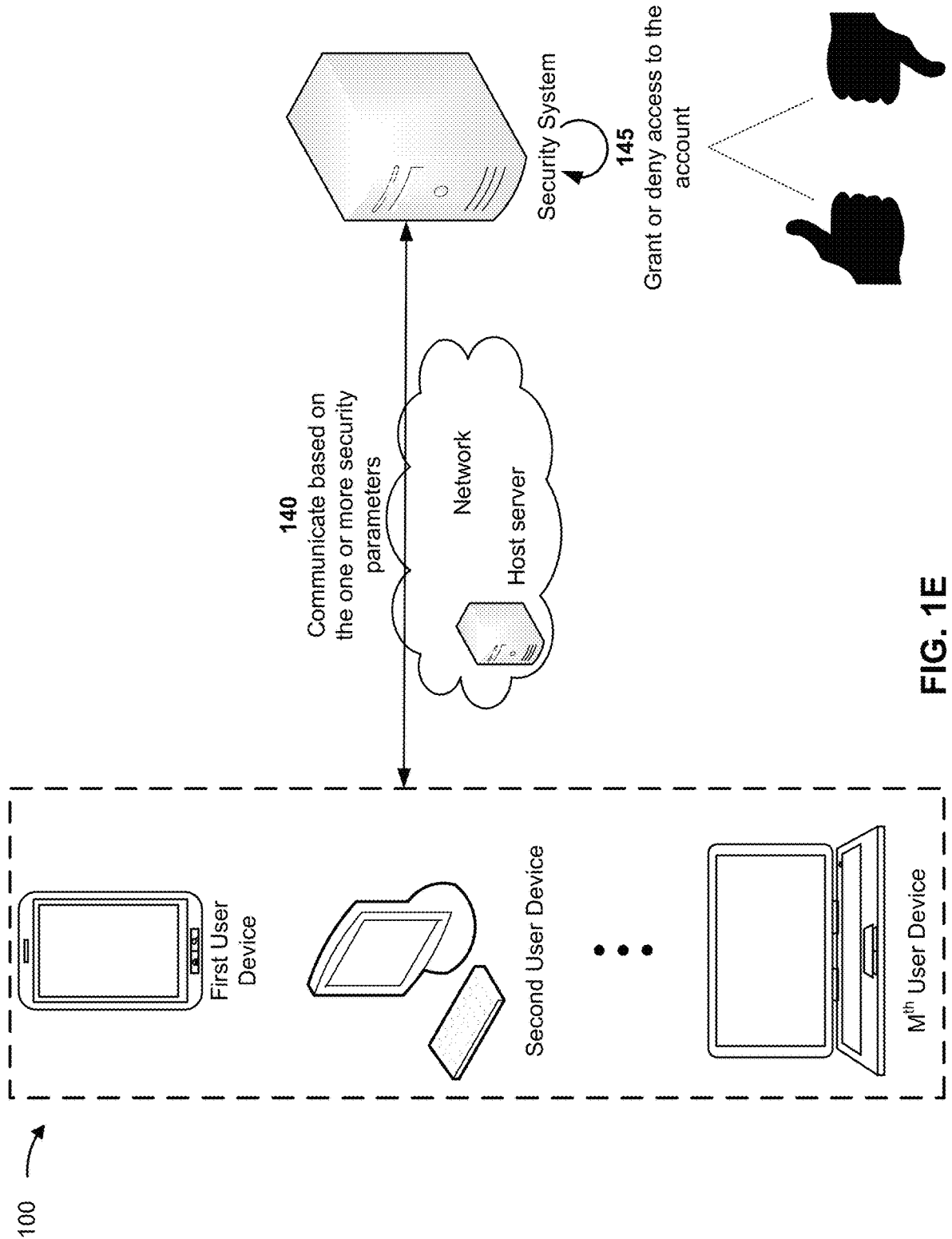

As shown in FIG. 1E, and by reference number 140, the security system may communicate with the particular user device (e.g., based on the modified one or more security parameters). For example, when the stepped-up authentication flag is set (e.g., as caused by the security system, described herein in relation to FIG. 1C), the security may communicate with the particular user device to obtain different and/or additional authentication credentials (e.g., than would be obtained if the stepped-up authentication flag were not set). Accordingly, as shown by reference number 145, the security system may grant or deny access to the account by the particular device (e.g., based on communicating with the particular device). For example, the security system may process (e.g., using one or more authentication techniques) the different and/or additional authentication credentials to make an authentication determination and may grant or deny access to the account based on the authentication determination. The security system may grant access to the account based on a positive authentication determination (e.g., the security system determined that the different and/or additional authentication credentials are valid) and/or may deny access to the account based on a negative authentication determination (e.g., the security system determined that the different and/or additional authentication credentials are invalid). Accordingly, when the security system grants access to the account, the particular user device is able to access and interact with the account. Alternatively, when the security system denies access to the account, the particular user device is unable to access and interact with the account.

Figure 1F:
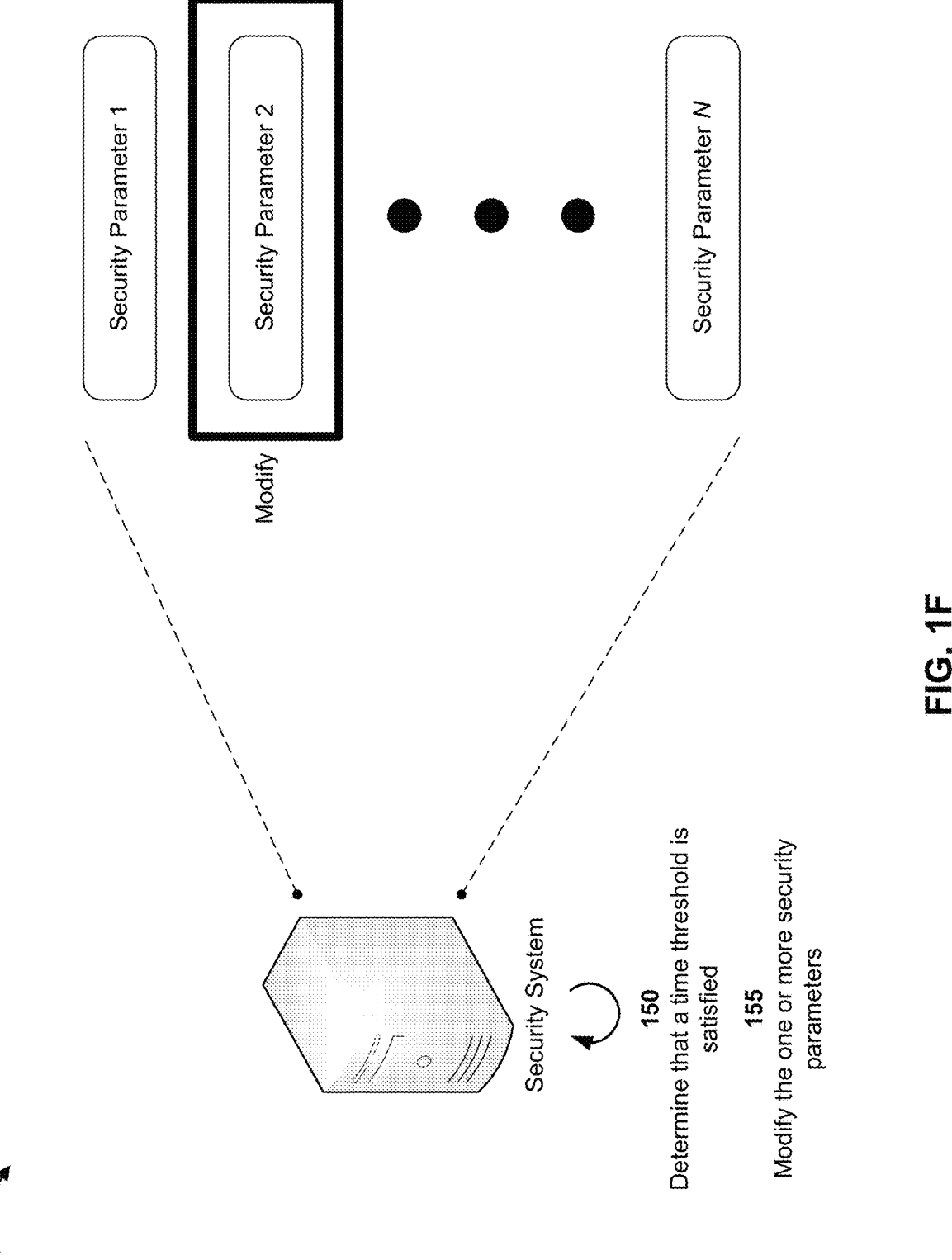

As shown in FIG. 1F, the security system may determine (e.g., after modifying the one or more security parameters associated with the account, as described herein in relation to FIG. 1C), an amount of time that has elapsed since the one or more security parameters were modified. Accordingly, as shown by reference number 150, the security system may determine whether the amount of time satisfies (e.g., is greater than or equal to) a time threshold, which may be greater than or equal to 5 hours, 12 hours, a day, a week, or a month, among other examples. As shown by reference number 155, when the security system determines that the amount of time satisfies the time threshold, the security system may modify the one or more security parameters associated with the account (e.g., that were previously modified by the security system). For example, the security system may modify the one or more security parameters to have "original" values or settings (e.g., prior to modifying the one or more security parameters associated with the account, as described herein in relation to FIG. 1C). Alternatively, when the security system determines that the amount of time does not satisfy the time threshold, the security system may prevent modification of the one or more security parameters associated with the account.

As indicated above, FIGS. 1A-1F are provided as an example. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of one or more examples 100 may perform one or more functions described as being performed by another set of devices of one or more examples 100. For example, the user device may perform one or more functions described as being performed by the security system, or vice versa.

Figure 2:
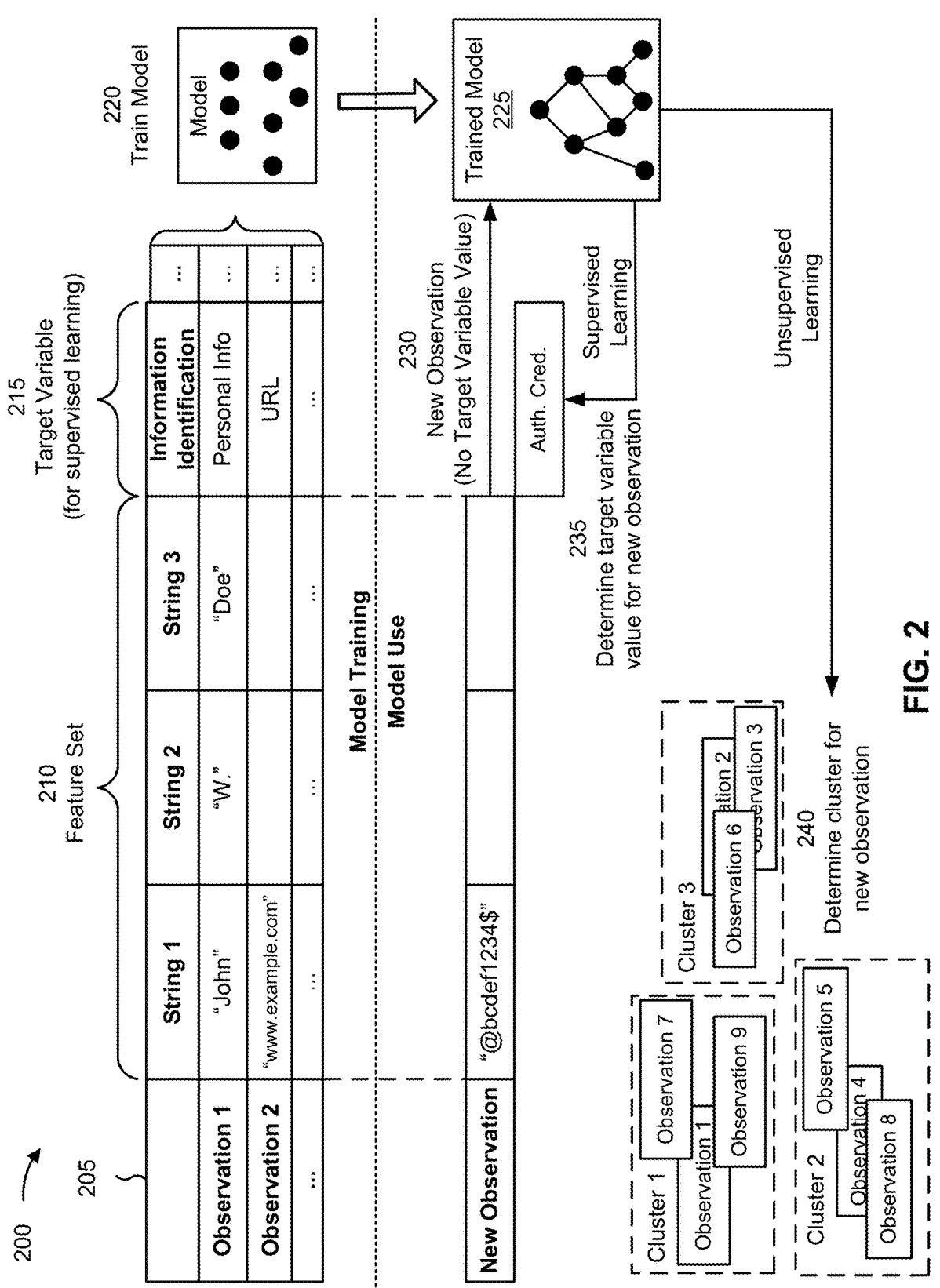
FIG. 2 is a diagram illustrating an example of training and using a machine learning model in connection with example implementations described herein.

FIG. 2 is a diagram illustrating an example 200 of training and using a machine learning model in connection with processing an input stream of a user device to facilitate security associated with an account of a user of the user device. The machine learning model training and usage described herein may be performed using a machine learning system. The machine learning system may include or may be included in a computing device, a server, a cloud computing environment, or the like, such as the first user device and/or the security system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the first user device and/or the security system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the first user device and/or the security system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of string 1, a second feature of string 2, a third feature of string 3, and so on (e.g., that are associated with an input stream). As shown, for a first observation, the first feature may have a value of "John", the second feature may have a value of "W.", the third feature may have a value of "Doe", and so on. These features and feature values are provided as examples, and may differ in other examples. For example, the feature set may include one or more cryptographic values (e.g., that are associated with the input stream).

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is information identification, which has a value of personal information for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of "@bcdef1234$" as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of authentication credential for the target variable of information identification for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a recommendation to notify the security system of the predicted value. The first automated action may include, for example, sending a notification that includes the predicted value to the security system.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., authentication credentials), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., potentially malicious URL addresses), then the machine learning system may provide a second recommendation (e.g., that is the same as or different from the first recommendation) and/or may perform or cause performance of a second automated action (e.g., that is the same as different from the first action).

In some implementations, the recommendation and/or automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to determine whether an input stream includes particular information. The machine learning system enables recognition and/or identification of tens, hundreds, thousands, or millions of features and/or feature values for tens, hundreds, thousands, or millions of observations, thereby increasing accuracy and consistency and reducing delay associated with determining whether an input stream includes particular information relative to requiring computing resources to be allocated for tens, hundreds, or thousands of operators to manually determine whether an input stream includes particular information using the features or feature values.

As indicated above, FIG. 2 is provided as an example. Other examples may differ from what is described in connection with FIG. 2.

Figure 3:
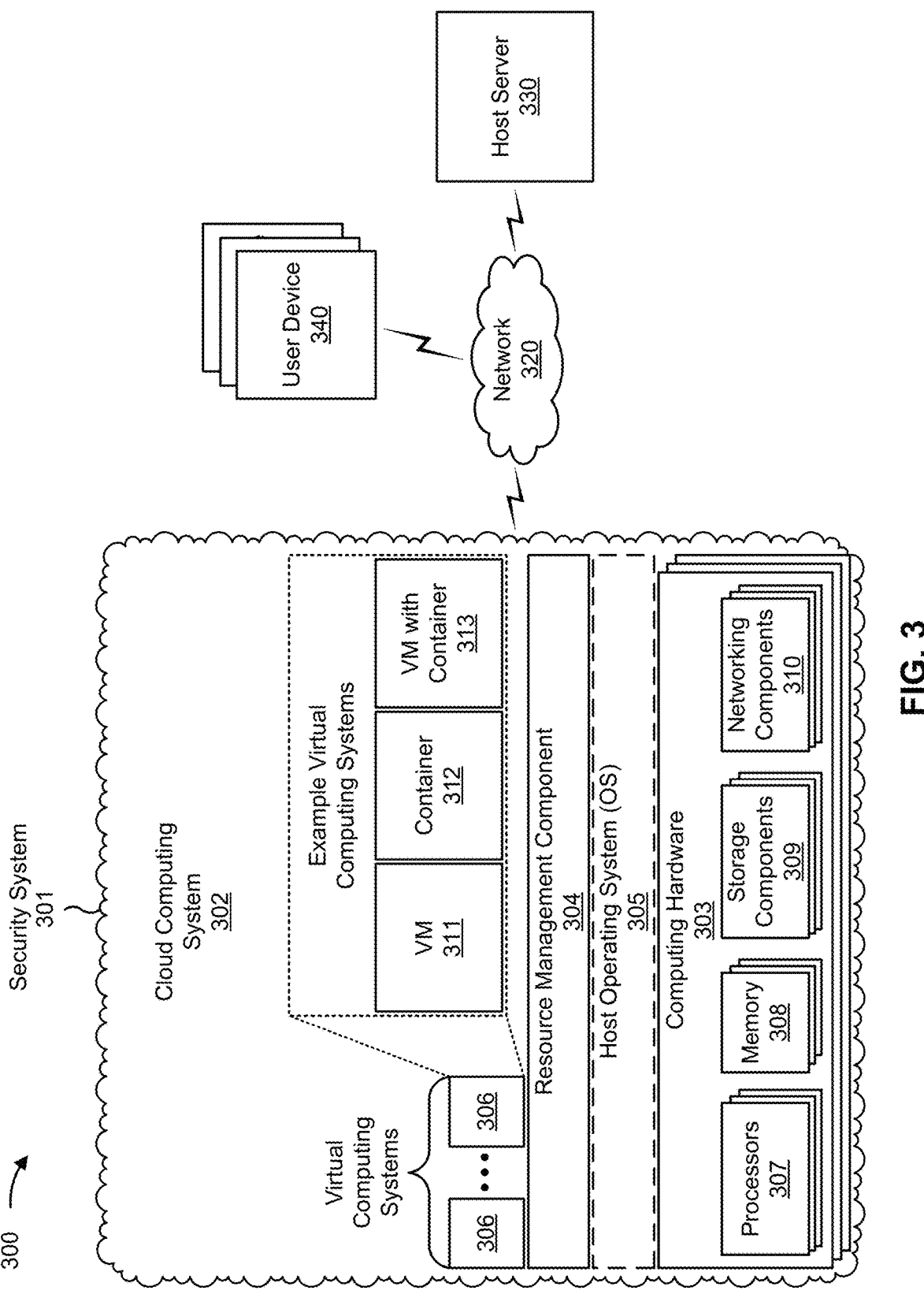
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a security system 301, which may include one or more elements of and/or may execute within a cloud computing system 302. The cloud computing system 302 may include one or more elements 303-213, as described in more detail below. As further shown in FIG. 3, environment 300 may include a network 320, a host server 330, and/or one or more user devices 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 3 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, or a hybrid environment 313 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the security system 301 may include one or more elements 303-213 of the cloud computing system 302, may execute within the cloud computing system 302, and/or may be hosted within the cloud computing system 302, in some implementations, the security system 301 may not be cloud-based (e.g., may be implemented outside of a cloud computing system) or may be partially cloud-based. For example, the security system 301 may include one or more devices that are not part of the cloud computing system 302, such as device 400 of FIG. 4, which may include a stand-alone server or another type of computing device. The security system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The host server 330 includes one or more devices capable of receiving, generating, storing, processing, providing, and/or routing information associated with an input stream of the user device 340 and/or facilitating security associated with an account of a user of the user device 340, as described elsewhere herein. The host server 330 may include a communication device and/or a computing device, such as a server device. For example, the host server 330 may include a server, such as an application server, a web server, a proxy server, a virtual server (e.g., executing on computing hardware), or a server in a cloud computing system. In some implementations, the host server 330 includes computing hardware used in a cloud computing environment.

The user device 340 includes one or more devices capable of receiving, generating, storing, processing, and/or providing information associated with an input stream of the user device 340 and/or facilitating security associated with an account of a user of the user device 340, as described elsewhere herein. The user device 340 may include a communication device and/or a computing device. For example, the user device 340 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
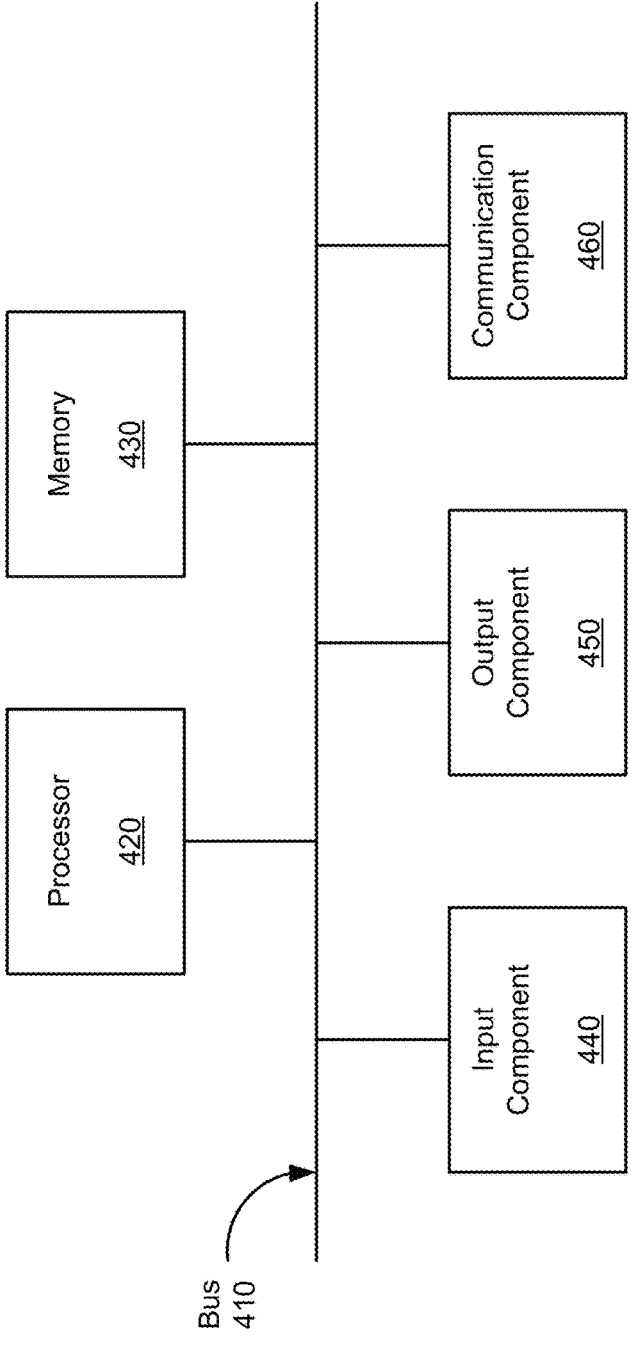
FIG. 4 is a diagram of example components of one or more devices of FIG. 3.

FIG. 4 is a diagram of example components of a device 400, which may correspond to security system 301, computing hardware 303, host server 330, and/or user device 340. In some implementations, security system 301, computing hardware 303, host server 330, and/or user device 340 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
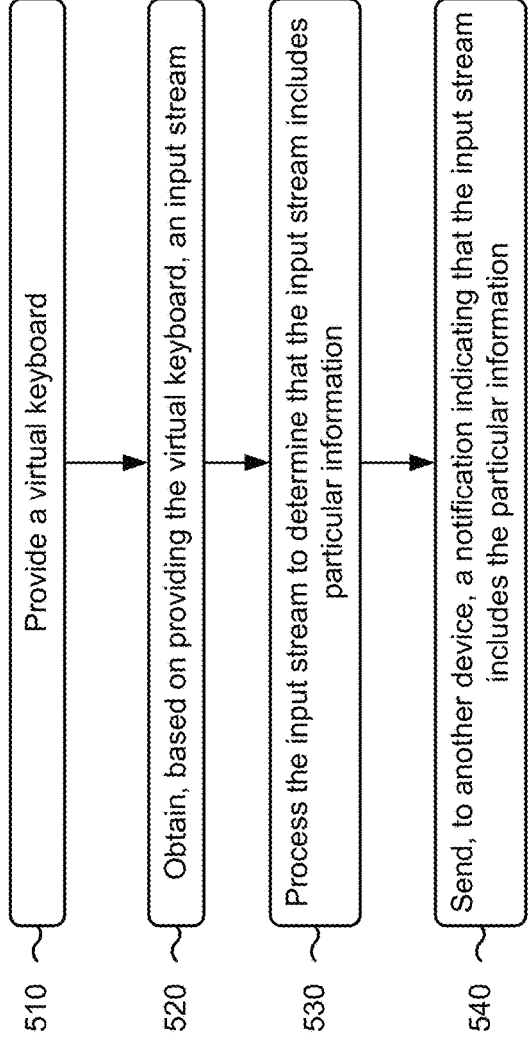
FIGS. 5-6 are flowcharts of example processes relating to processing an input stream of a user device to facilitate security associated with an account of a user of the user device.

FIG. 5 is a flowchart of an example process 500 associated with processing an input stream of a user device to facilitate security associated with an account of a user of the user device. In some implementations, one or more process blocks of FIG. 5 may be performed by the user device (e.g., user device 340). In some implementations, one or more process blocks of FIG. 5 may be performed by another device or a group of devices separate from or including the user device, such as a system (e.g., security system 301). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include providing a virtual keyboard (block 510). The virtual keyboard may be provided for display on a display screen of the user device. As further shown in FIG. 5, process 500 may include obtaining, based on providing the virtual keyboard, an input stream (block 520). As further shown in FIG. 5, process 500 may include processing the input stream to determine that the input stream includes particular information (block 530). As further shown in FIG. 5, process 500 may include sending, to another device, a notification indicating that the input stream includes the particular information (block 540).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1F.

Figure 6:
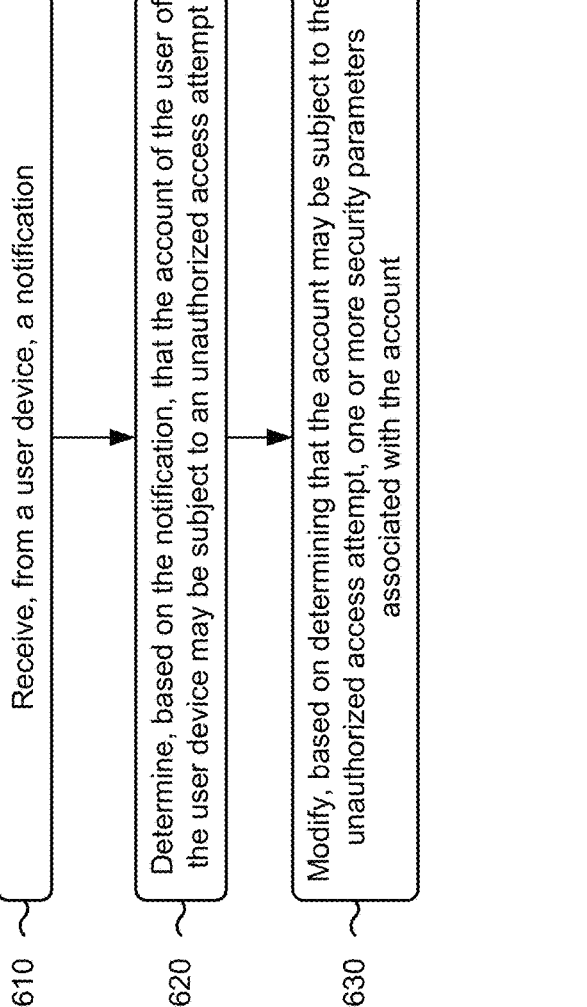

FIG. 6 is a flowchart of an example process 600 associated with processing an input stream of a user device to facilitate security associated with an account of a user of the user device. In some implementations, one or more process blocks of FIG. 6 may be performed by a system (e.g., security system 301). In some implementations, one or more process blocks of FIG. 6 may be performed by another device or a group of devices separate from or including the system, such as the user device (e.g., user device 340). Additionally, or alternatively, one or more process blocks of FIG. 6 may be performed by one or more components of device 400, such as processor 420, memory 430, input component 440, output component 450, and/or communication component 460.

As shown in FIG. 6, process 600 may include receiving, from a user device, a notification (block 610). The notification may indicate that an input stream obtained by the user device includes particular information. As further shown in FIG. 6, process 600 may include determining, based on the notification, that the account of the user of the user device may be subject to an unauthorized access attempt (block 620). As further shown in FIG. 6, process 600 may include modifying, based on determining that the account may be subject to the unauthorized access attempt, one or more security parameters associated with the account (block 630).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1F.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A non-transitory computer-readable medium storing a set of instructions, the set of instructions comprising:
    one or more instructions that, when executed by one or more processors of a device, cause the device to:
        provide, based on an interaction with the device causing the device to execute an application, a virtual keyboard for display on a display screen of the device;
        obtain, via the virtual keyboard, an input stream;
        process, in real-time or near real-time, the input stream to identify one or more strings included in the input stream;

process, using one or more cryptographic techniques, the one or more strings to generate one or more cryptographic values;

compare the input stream, the one or more strings, and the one or more cryptographic values to information stored in a data structure associated with the device to determine whether the input stream includes particular information; and send, to a different device, a notification indicating that the input stream includes the particular information, wherein sending the notification causes the different device to modify one or more security parameters associated with an account of a subject of the device in response to determining that the input stream includes the particular information based on comparing the input stream, the one or more strings, and the one or more cryptographic values to the information stored in the data structure associated with the device.

2. The non-transitory computer-readable medium of claim 1, wherein the one or more instructions, that cause the device to obtain the input stream, cause the device to:

obtain one or more characters that are input into the device via the virtual keyboard; and store the one or more characters as the input stream in a different data structure, wherein a size of the different data structure is dynamic.

3. The non-transitory computer-readable medium of claim 2, wherein the size of the different data structure is configured to dynamically change based on at least one of:

a value of at least one character of the one or more characters;

a pattern of at least one set of characters of the one or more characters;

a total amount of time associated with inputting the one or more characters;

a total quantity of the one or more characters; or a display status of the virtual keyboard.

4. The non-transitory computer-readable medium of claim 1, wherein the particular information includes at least one of:

an authentication credential associated with the account of the subject of the device;

personal information associated with the subject of the device; or a potentially malicious universal resource locator (URL) address.

5. The non-transitory computer-readable medium of claim 1, wherein the one or more instructions, when executed by the one or more processors, further cause the device to:

process, using a machine learning model, the one or more strings to determine that the input stream includes the particular information.

6. The non-transitory computer-readable medium of claim 1, wherein the particular information includes an authentication credential associated with the account of the subject of the device, wherein the one or more instructions, when executed by the one or more processors, further cause the device to:

identify authentication credential information stored in a different data structure, wherein the different data structure is configured to store information associated with the account of the subject of the device; and determine, based on the one or more cryptographic values and the authentication credential information, that the input stream includes the authentication credential associated with the account of the subject of the device.

7. The non-transitory computer-readable medium of claim 1, wherein the particular information includes personal information associated with the subject of the device, wherein the one or more instructions, when executed by the one or more processors, further cause the device to:

identify subject information stored in the data structure, wherein the data structure is configured to store information associated with the subject of the device; and determine, based on the one or more strings and the subject information, that the input stream includes the personal information associated with the subject of the device.

8. The non-transitory computer-readable medium of claim 1, wherein the particular information includes a potentially malicious universal resource locator (URL) address, wherein the one or more instructions, that cause the device to process the input stream to determine that the input stream includes the particular information, cause the device to:

process the input stream to determine that the input stream includes a URL address;

identify URL address information stored in a different data structure, wherein the different data structure is configured to store information associated with potentially malicious URL addresses; and determine, based on the URL address and the URL address information, that the input stream includes the potentially malicious URL address.

9. A system for facilitating security associated with an account of a subject, the system comprising:

one or more memories; and one or more processors, communicatively coupled to the one or more memories, configured to:

receive, from a device and in response to a determination that an input stream obtained via a virtual keyboard provided by the device includes particular information based on comparing the input stream, one or more strings of the input stream, and one or more cryptographic values associated with the one or more strings to stored information, a notification indicating that the input stream includes the particular information, wherein the input stream is obtained by the device via a virtual keyboard provided on a display screen of the device based on an interaction with the device causing the device to execute an application;

determine, based on the notification, that the account of the subject may be subject to an unauthorized access attempt; and

modify, based on determining that the account may be subject to the unauthorized access attempt, one or more security parameters associated with the account.

10. The system of claim 9, wherein the virtual keyboard is installed on the device.

11. The system of claim 9, wherein the one or more processors, to modify the one or more security parameters associated with the account, are configured to:

cause an authentication credential reset procedure associated with the account to be initiated.

12. The system of claim 9, wherein the one or more processors, to modify the one or more security parameters associated with the account, are configured to:

cause a stepped-up authentication flag associated with the account to be set.

13. The system of claim 9, wherein the one or more processors are further configured to:

send, after modifying the one or more security parameters associated with the account, and to an electronic messaging account associated with the subject, a message including at least one of the particular information or information indicating modification of the one or more security parameters associated with the account.

14. The system of claim 9, wherein the one or more processors are further configured to:

receive, after modifying the one or more security parameters associated with the account, and from a particular device of the device or a different device, a request for access to the account;

communicate, based on the one or more security parameters, with the particular device; and grant or deny, based on communicating with the particular device, access to the account by the particular device.

15. The system of claim 9, wherein the one or more processors are further configured to:

determine, after modifying the one or more security parameters associated with the account, an amount of time that has elapsed since the one or more security parameters were modified;

determine that the amount of time satisfies a time threshold; and modify, based on determining that the amount of time satisfies the time threshold, the one or more security parameters associated with the account.

16. A method, comprising:

obtaining, via a virtual keyboard provided by a device, an input stream, wherein the input stream is obtained via the virtual keyboard provided by the device based on an interaction with the device causing the device to execute an application;

processing, by the device, the input stream to identify one or more strings included in the input stream;

processing, by the device and using one or more cryptographic techniques, the one or more strings to generate one or more cryptographic values;

comparing, by the device, the input stream, the one or more strings, and the one or more cryptographic values to information stored in a data structure to determine whether the input stream includes particular information; and causing, by the device and in response to determining that the input stream includes the particular information based on comparing the input stream, the one or more strings, and the one or more cryptographic values to the information stored in the data structure associated with the device, one or more security parameters associated with an account of a subject of the device to be modified.

17. The method of claim 16, further comprising:

identifying authentication credential information stored in the data structure, wherein the data structure is configured to store information associated with the account of the subject of the device; and determining, based on the one or more strings and the authentication credential information, that the input stream includes an authentication credential associated with the account of the subject of the device.

18. The method of claim 16, wherein causing the one or more security parameters associated with the account to be modified comprises:

sending, to a different device, a notification indicating that the input stream includes the particular information, wherein sending the notification to the different device causes the different device to modify the one or more security parameters associated with the account.

19. The method of claim 16, wherein causing the one or more security parameters associated with the account to be modified causes at least one of:

an authentication credential reset procedure associated with the account to be initiated; or a stepped-up authentication flag associated with the account to be set.

20. The method of claim 16, further comprising:

processing, using a machine learning model, the one or more strings to determine that the input stream includes the particular information.

* * * * *